United States Patent Office 3,839,397
Patented Oct. 1, 1974

3,839,397
PROCESS FOR PRODUCING 2-CHLORO-2-CYANO-
$\Delta^5$ - 7 - SYN-ALKOXYMETHYL-BICYCLO[2.2.1]
HEPTENE,
Ned M. Weinshenker, Sunnyvale, Calif., assignor to
ALZA Corporation
No Drawing. Filed June 11, 1971, Ser. No. 152,445
Int. Cl. C07c *121/48, 121/74*
U.S. Cl. 260—464                                     4 Claims

ABSTRACT OF THE DISCLOSURE

A novel process for preparing a 2,2-disubstituted-$\Delta^5$-7-monosubstituted-bicyclo[2.2.1]heptene of the general formula

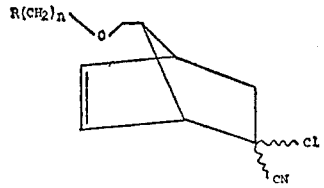

wherein R is hydrogen,

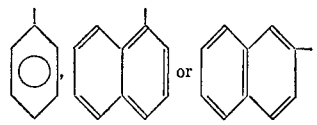

and $n$ is 1 to 7 by reacting in a single reaction cyclopentadienyl thallium, 2-chloroacrylonitrile and $$X\text{—}CH_2O(CH_2)_nR$$

wherein R and $n$ are as defined and X is a halogen. The 2,2 - disubstituted - $\Delta^5$-7 - syn-monosubstituted-bicyclo-[2.2.1]heptenes are useful for preparing therapeutically valuable prostaglandins.

RELATED APPLICATIONS

This application is copending with United States Patent Application, Ser. No. 108,967, filed on Jan. 22, 1971, and entitled "Process for Producing Substituted Cyclopentadienes."

BACKGROUND OF THE INVENTION

Field of the invention

The present invention relates to both a novel and useful process for preparing 2,2-disubstituted-$\Delta^5$-7-syn-monosubstituted-bicyclo[2.2.1]heptenes of the general formula

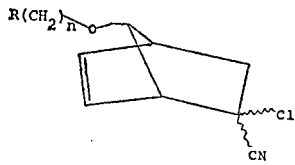

wherein R is hydrogen,

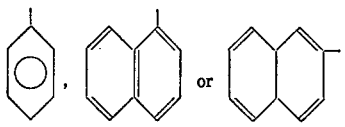

and $n$ is 1 to 7. The 2,2-disubstituted-$\Delta^5$-7-syn-monosubstituted-bicyclo[2.2.1]heptenes are prepared in a single reaction by reacting cyclopentadienyl thallium of the formula

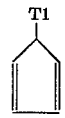

with an ether of the formula $R(CH_2)_nOCH_2X$ wherein R is H,

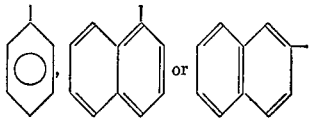

$n$ is 1 to 7, X is a halogen, for example, chlorine, bromine or iodine, with an acrylonitrile of the formula

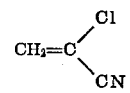

and in the presence of a catalyst. The 2,2-disubstituted-$\Delta^5$-7-syn-monosubstituted-bicyclo[2.2.1]heptenes are useful as intermediates for preparing by art known chemical methods therapeutically useful prostaglandins.

Description of the prior art

The prostaglandins are a naturally occurring group of longchain, unsaturated, oxygenated fatty acids with useful therapeutic properties. The prostaglandins' properties, as recorded in *Prostaglandins, Progress in the Chemistry of Fats and Other Lipids, Vol. IX,* Part 2, pages 231 to 273, 1968, Pergamon Press, broadly includes modifiers of smooth muscle activity, gastric secretion, blood pressure, the reproductive system and the like. The chemical art, because of the prostaglandins' valuable properties, has made available in *J. Am. Chem. Soc., Vol. 91,* pages 5675 to 5677, 1969; *ibid, Vol. 93,* pages 1489 to 1491, 1971, chemical synthesis for preparing the prostaglandins.

In the earlier reported chemical synthesis of intermediates leading to prostaglandins, certain disadvantages were encountered by the prior art in one of the chemical steps for synthesizing useful prostaglandins; mainly, in the addition of cyclopentadienyl sodium or cyclopentadienyl lithium to a halo-methyl methyl ether to produce 5-methoxymethyl - 1,3 - cyclopentadiene. One of the encountered disadvantages included the formation of the unwanted isomerization product 1-methoxymethyl-1,3-cyclopentadiene that is not used for the synthesis of prostaglandins. This product is formed because of the relatively high basicity of the cyclopentadienyl sodium or lithium, and also because of the continual presence and reaction of the latter cyclopentadienyls with halomethylmethyl ether and the newly formed 5-substituted-1,3-cyclopentadiene. The further formation of the isomerization product, 1-methoxymethyl-1,3-cyclopentadiene resulted in decreased yields of 5-substituted - 1,3 - cyclopentadiene and concomitantly therewith decreased yields of useful prostaglandins.

Another disadvantage encountered with the use of cyclopentadienyl sodium or lithium is the need for a tedious and difficult isolation step requiring a buffer or an aqueous work-up of the reaction medium for removing from the medium unreacted cyclopentadienyl sodium or lithium and sodium or lithium halides formed during the isolation of isomerically pure 5-substituted-1,3-cyclopentadiene. Additionally, the work-up is required to prevent the formation of 1-methoxymethyl-1,3-cyclopentadiene and low yields of 5-substituted-1,3-cyclopentadiene.

In United States Patent Application, Ser. No. 108,967, filed Jan. 22, 1971 and assigned to the same assignee of this patent application, there is disclosed a novel and useful process for preparing 5-(lower alkoxymethyl) and 5-(arylalkoxymethyl)-1,3-cyclopentadienes that essentially overcomes the known difficulties of the prior art. The process disclosed in U.S. Ser. No. 108,967 for preparing 5-substituted-1,3-cyclopentadienes comprises reacting cyclopentadienyl thallium with lower alkyl or arylalkyl halomethyl ether to produce essentially pure 5-substituted-1,3-cyclopentadienes with improved yields that can be isolated from the reaction medium without all the tedious work-up of the reaction medium required theretobefore to obtain monoalkylated cyclopentadiene. Next, the prior art in the synthesis of prostaglandins subjected the newly prepared and isolated monoalkylated cyclopentadiene to a Diels-Adler reaction with 2-chloroacrylonitrile in the presence of cupric fluoroborate to yield the intermediate 2,2-disubstituted-$\Delta^5$-7-syn-monosubstituted-bicyclo-[2.2.1]heptene. This reaction was performed under separate reaction conditions and in a separate reaction vessel than those used for the preparation of monoalkylated cyclopentadiene as reported in *J. Am. Chem. Soc.*, Vol. 91, pages 5675 to 5677, 1969; and *ibid*, Vol. 93, pages 1489 to 1493. The performance of this latter reaction frequently leads to many difficulties, for example, the deleterious effects of air and moisture often encountered in mixing the metalated cyclopentadiene, the halomethyl methyl ether and the acrylonitrile, the need to isolate the product under an inert atmosphere, and other conditions that tended to lessen the yield of the desired product. Thus, in view of the foregoing discussion, it can be seen that the art needs a novel and improved chemical synthesis for preparing 2,2 - disubstituted - $\Delta^5$ - 7 - syn-monosubstituted-bicyclo [2.2.1]heptene that is useful for preparing pharmacologically valuable prostaglandins.

Objects of the invention

Accordingly, it is an object of the present invention to make available to the art a novel chemical process for preparing 2,2-disubstituted - $\Delta^5$ - 7 - syn-monosubstituted-bicyclo[2.2.1]heptene that essentially overcomes the disadvantages encountered by the prior art.

It is a further object of the present invention to provide a novel process for preparing 2,2-disubstituted-$\Delta^5$-7-syn-monosubstituted-bicyclo[2.2.1]heptene that can be used in art known chemical synthesis for producing therapeutic useful prostaglandins.

Still a further object of the invention is to provide a process for preparing 2,2-disubstituted-$\Delta^5$-7-syn-monosubstituted-bicyclo[2.2.1]heptenes wherein the process does not require extensive work-up and does not tend to produce unwanted products.

Yet still a further object of the invention is to simplify the two reaction steps for preparing 2,2-disubstituted-$\Delta^5$-7-syn-monosubstituted-bicyclo[2.2.1]heptenes by combining the prior art's two reaction steps into a single reaction.

Yet another object of the invention is to provide a process for preparing 2,2-disubstituted-$\Delta^5$-7 - syn - mono-substituted-bicyclo[2.2.1]heptene by combining the reactants of two reactions into a single reaction wherein the synthesis is reproducible, easy to carry out and not subjected to decreased yields of the desired product.

These and other objects of the invention will be readily apparent to one skilled in the art upon a study of the present disclosure and the accompanying claims.

SUMMARY OF THE INVENTION

This invention concerns both a novel and useful improved process for preparing 2,2-disubstituted-$\Delta^5$-7-monosubstituted-bicyclo[2.2.1]heptenes by reacting in a single reaction cyclopentadienyl thallium, a lower alkyl or a arylalkyl halomethyl ether and $\alpha$-chloroacrylonitrile in an organic solvent and then adding a Diels-Alder catalyst to produce 2,2-disubstituted - $\Delta^5$ - 7 - syn-monosubstituted-bicyclo[2.2.1]heptene. The latter compound is useful for preparing prostaglandins by known chemical processes.

DETAILED DESCRIPTION OF THE INVENTION

In attaining the objects and advantages of this invention, it has now been unexpectedly found that a novel and improved process for preparing 2,2-disubstituted-$\Delta^5$-7-syn-monosubstitutedbicyclo[2.2.1]heptene can be made available to the art as represented by the following general reaction:

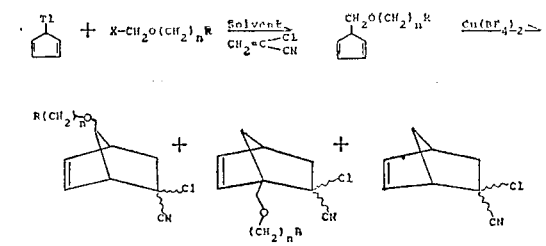

wherein R is a member selected from the group consisting of hydrogen, phenyl, $\alpha$-naphthyl and $\beta$-naphthyl, X is a halogen selected from the group consisting of chloro, bromo, and iodo, $n$ is 1 to 7, that is, an alkylene such as methylene, ethylene, propylene, iso-propylene, butylene, and the like.

The novel reaction is carried out by intimately contacting and reacting the reactants in a single reaction vessel where the prior art used two reaction vessels. That is, this invention makes possible the direct alkylation of 5-substituted - 1,3 - cyclopentadiene with halomethylalkyl ether in the presence of the dienophile $\alpha$-chloroacrylonitrile without any apparent side reactions. This reaction occurs at a temperature of about $-10°$ C. to $-30°$ C., is instantaneous, and is carried out in a mixed solvent consisting of $\alpha$-chloroacrylonitrile and an inert organic solvent. The $\alpha$-chloroacrylonitrile in this reaction performs two functions, first it is a reactant, and secondly, it is a partial solvent for the reaction. Next, after a short period of about 5 minutes to 30 minutes the Diels-Alder catalyst, is added directly to the reaction medium and the reaction is allowed to proceed in the same reaction vessel at a temperature of $-5°$ C. to $10°$ C. for about 18 to 30 hours.

The reaction mixture typically consists of three products identified as I, II, and III in a ratio of about 5:1:0.5 as follows:

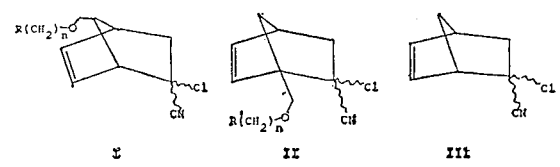

The reaction is usually carried out by reacting stoichiometric amounts or an excess of the reactants under normal atmospheric pressure or at elevated pressures up to 5 atmosphere. The reaction is typically performed in an inert atmosphere, including the inert gases such as argon, nitrogen, and the like, and mixtures of inert gases. The product is recovered from the reaction vessel by filtering and washing the recovered solid with anhydrous ether. The recovered solid is essentially pure thallium halide and it can be used in a recycling step to produce cyclopentadienyl thallium. Next, the filtrate is extracted several times with 5% to 20% mineral acid, usually hydrochloric, then with saturated brine followed by drying and concentrating at about 75° C. to 90° C. with water aspirator pressure, usually about 25 mm. Finally, the residue is distilled to yield the desired product, as shown by FIG. 1, having an isomeric purity in excess of 85%.

Exemplary of reacting ethers suitable for the above reaction are the commercially available and art known ethers such as 2-bromoethyl methyl ether; bromomethyl methyl ether; bromomethyl propyl ether; bromomethyl iso-propyl ether; chloromethyl methyl ether; iodomethyl ethyl ether; bromomethyl benzyl ether; chloromethyl α-naphthyl ether; and the like as disclosed in *J. Org. Chem., Vol. 26*, pages 3761 to 3769, 1961; *Chem. Abst., Vol. 52*, page 1601; *ibid, Vol. 53*, page 1105; *ibid, Vol. 56*, page 7223; *ibid, Vol. 58*, page 1331; and *ibid, Vol. 65*, page 2239. Exemplary of a suitable solvent is a solvent that does not adversely affect the reaction, such as, diethyl ether, 1,2-dimethylethane, tetrahydrofuran, methyl ethyl ether, dioxane, benzene, and the like. The cyclopentadienyl thallium used according to the spirit of the invention is commercially available and it is further known to the art in *Chem. Abst., Vol. 52*, page 16336; and in Belgian Pat. No. 620,663. Examples of Diels-Alder catalysts suitable for the purpose of this invention include catalysts such as copper tetrafluoroborate, cupric bromide, and the like.

The following examples are representative of embodiments of the present invention and these examples are not to be construed as limiting as these and other embodiments will be readily apparent to those versed in the art in the light of the present disclosure and accompanying claims.

EXAMPLE 1

Preparation of 2 - chloro-2-cyano-$\Delta^5$-7-syn-methoxymethylbicyclo[2.2.1]heptene.—A dry three-necked flask equipped with a thermometer, a stirrer and an inlet-outlet port was charged with 1 kg. (3.72 moles) of cyclopentadienyl thallium and a mixed cosolvent consisting of 1,500 ml. of dry diethyl ether and 1,500 ml. of α-chloroacrylonitrile under an inert argon atmosphere. The reaction mixture was cooled to about −10° C. to −15° C. and 450 g. (3.63 moles) or anhydrous bromomethyl methyl ether was added dropwise and with constant stirring to the reaction mixture. The internal reaction temperature was maintained at about −10° C. during the addition of the halogenated ether over a 20 to 30 minute period. The alkylation of the cyclopentadiene by the halogenated ether was instantaneous to form 5-methoxymethyl-1,3-cyclopentadiene. The reaction mixture was allowed to stir at −10° C. for 10 minutes to insure a completed alkylation by the reactants. Next, 450 g. (1.86 moles) of anhydrous finely powdered copper tetrafluoroborate, the Diels-Adler catalyst, was added directly to the flask containing the 5-methoxymethyl-1,3-cyclopentadiene which was subjected to the Diels-Adler reaction with the dienophile solvent α-chloroacrylonitrile at 0° C. to 5° C. for about 18 hours. Next, the reaction mixture was filtered and the recovered solid washed several times with diethyl ether to yield thallium bromide that can be recycled to synthesize the starting reactant cyclopentadienyl thallium. The inorganic copper salts were extracted with 10% hydrochloric acid by extracting the filtrate three times with a liter thereof each time. The organic phase was then washed with saturated brine, and dried over MgSO$_4$ and concentrated *in vacuo* at about 80° C. with water aspirator pressure. Next, the residue that remained after the extractions was distilled under a reduced pressure of about 0.5 mm. and at a temperature of about 85° C. to 100° C. to yield about 450 to 550 grams (62.5 to 76.5%) of the desired product 2-chloro-2-cyano-$\Delta^5$-7-syn-methoxymethylbicyclo[2.2.1]heptene.

EXAMPLE 2

Preparation of 2 - chloro - 2-cyano-$\Delta^5$-7-syn-benzyloxymethylbicyclo[2.2.1]heptene.—A dry flask is charged with 500 g. (1.86 moles) of cyclopentadienyl thallium and mixed cosolvent of 750 ml. of anhydrous ether and 750 ml. of α-chloroacrylonitrile under an argon atmosphere. The reaction mixture is cooled to −10° to −15° C. and 360 g. (1.8 moles) of bromomethyl benzyl ether is added with constant stirring over a 20 to 30 minute period at this temperature. The alkylation is instantaneous and the reaction mixture is allowed to stir for about 10 minutes to insure a completed alkylation. Next 225 g. of anhydrous finely powdered copper tetrafluoroborate is added directly to the flask and the reaction carried out at 0° C. to 5° C. for about 20 hours. The reaction mixture was extracted, dried and concentrated as in Example 1 to yield 2 - chloro-2-cyano-$\Delta^5$-7-syn-benzyloxymethylbicyclo[2.2.1]heptene.

EXAMPLE 3

Repeating the procedure of Example 1, but replacing bromomethyl methyl ether with chloromethyl ethyl ether; chloromethyl propyl ether and chloromethyl α-naphthyl methyl ether; the reaction produces 2-chloro-2-cyano-$\Delta^5$-7 - syn-ethoxymethylbicyclo[2.2.1]heptene; 2-chloro-2-cyano - $\Delta^5$-7-syn-propoxymethylbicyclo[2.2.1]heptene; and, 2 - chloro - 2 - cyano - $\Delta^5$-7-syn-α-naphthylmethylbicyclo[2.2.1]heptene.

The compounds produced by this invention have art known utilities, for example, 2-chloro-2-cyano-$\Delta^5$-7-syn-methoxymethylbicyclo[2.2.1]heptene is used for the production of stereo-controlled synthesis of pharmaceutically active prostaglandins as set forth in *J. Am. Chem. Soc., Vol. 91*, pages 5675 to 5678, 1969. The compound is used in the reaction listed in the reference as 1 through 16 inclusive to yield prostaglandins such as PGE$_2$ (11α,15(S) dihydroxy - 9 - oxo-5-cis,13-trans-prostadienoic acid) and PGE$_{2\alpha}$ (9α,11α,15α(S)-trihydroxy-5-cis,13-trans-prostadienoic acid). Both of these prostaglandins are useful as therapeutics, such as, for inducing labor, the stimulation of smooth muscles, for the termination of pregnancy, and other known uses.

As is evident from the above discussion and examples, it is readily apparent that this invention makes available to the art an unobvious single step method for producing 2,2-disubstituted - $\Delta^5$ - 7 - syn-monosubstituted-bicyclo[2.2.1] heptenes that can be successfully used for synthesizing valuable prostaglandins without being subjected to the problems associated with the prior art. And, while various illustrative embodiments of the invention have been described with particularity, it will be understood that various modifications will be apparent and can be readily made by those skilled in the art without departing from the scope and the spirit of the invention.

We claim:

1. A process for the preparation of a 2,2-disubstituted-$\Delta^5$ - 7 - syn-monosubstituted-bicyclo[2.2.1]heptene having the structural formula:

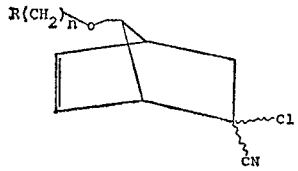

wherein R is a member selected from the group consisting of hydrogen, phenyl and naphthyl, and $n$ ranges from 1 to 7, which process comprises directly alkylating cyclopentadienyl thallium with a halomethylalkyl ether of the formula, X—CH$_2$O(CH$_2$)$_n$R, wherein R and $n$ are as above and X is halogen, at a temperature in the range of between about −10° C. to −30° C. and in the presence of a reaction medium comprising an inert organic solvent and the dienophile, partial reaction solvent, α-chloroacrylonitrile, and thence, in the same reaction vessel and without isolation or separation of any reaction intermediates, directly adding a Diels-Alder catalyst to the reaction medium and continuing the said reaction to completion at a temperature of between about −5° C. to 10° C.

2. The process as defined by Claim 1 wherein the reaction is conducted in an inert atmosphere and under a pressure ranging from about atmospheric to about 5 atmospheres.

3. The process as defined by Claim 1, wherein the Diels-Adler catalyst is copper tetrafluoroborate.

4. The process as defined by Claim 1, wherein the desired product is recovered by filtration, washing, extraction and concentration, and the concomitantly recovered thallium halide is recycled to a cyclopentadienyl thallium synthesis.

References Cited

Corey et al.: J. Am. Chem. Soc., vol. 93, pp. 1489–1491 (1971).

Corey et al.: J. Am. Chem. Soc., vol. 91, pp. 5675-7 (1969).

ELBERT L. ROBERTS, Primary Examiner

D. H. TORRENCE, Assistant Examiner

U.S. Cl. X.R.

260—465 F, 514 D, 999